United States Patent Office 3,530,126
Patented Sept. 22, 1970

3,530,126
N-HETEROCYCLIC SUBSTITUTED CYCLOHEXANES
Raymond Bernasconi, Oberwil, Basel-Land, and Karl Schenker, Binningen, Switzerland, assignors to Ciba Corporation, New York, N.Y., a corporation of Delaware
No Drawing. Filed Sept. 7, 1966, Ser. No. 577,621
Claims priority, application Switzerland, Sept. 29, 1965, 13,439/65; Aug. 19, 1966, 12,030/66
Int. Cl. C07d 29/32, 41/02
U.S. Cl. 260—247       17 Claims

ABSTRACT OF THE DISCLOSURE

Compounds of the formula

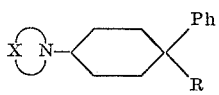

in which X represents an alkylene radial which may be interrupted by an oxygen atom, pH stands for a phenyl radical and R for a cyano group or a carbalkoxy radical, and their salts, useful as anti-tussives or analgesics.

---

The present invention relates to new cyclohexane derivatives. Especially it concerns compounds of the formula

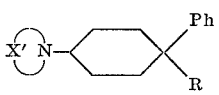

in which X represents an alkylene radical which may be interrupted by an oxygen atom, Ph stands for a phenyl radical and R for a cyano group or a carbalkoxy radical, and their salts.

The alkylene radical which may be interrupted by an oxygen atom is more especially a lower alkylene or oxa-alkylene radical, for example a propylene-(1,3), butylene-(1,4), butylene-(1,3), pentylene-(1,5), hexylene-(1,5), hexylene-1,6), hexylene-(2,5), heptylene-(1,7), 2-methyl-pentylene-(1,5), 3-ethyl-pentylene-(1,5), heptylene-(2,7), heptylene-(2,6), 3-oxa-pentylene-(1,5), 3-oxa-hexylene-(1,6), 3-oxa-hexylene-(1,5) or 2-methyl-3-oxa-pentylene-(1,5) radical.

The phenyl radical Ph can be unsubstituted or may contain one, two or more substituents. Possible substituents for this are more especially lower alkyl radicals, free or substituted hydroxyl groups, for example lower alkoxy groups, halogen atoms or trifluoromethyl groups.

Lower alkyl radicals are, for example, methyl, ethyl, propyl or isopropyl groups, straight or branched butyl, pentyl or hexyl groups bound in any desired position. Lower alkoxy groups are more especially methoxy, ethoxy, propoxy, butoxy or pentyloxy groups, and halogen atoms are especially fluorine, chlorine or bromine atoms.

The carbalkoxy radical R is primarily a lower carbalkoxy, for example, a carbobutoxy, carbopropoxy or carbethoxy radical or particularly a carbomethoxy radical.

The new compounds have valuable pharmacological properties. Thus, in addition to pronounced inhibition of the polysynaptic reflex transmission, they have more especially an antitussive effect, as is shown in animal experiments, for example in the cat. Moreover, they have a strong anti-morphine effect, for example in animal experiments, e.g. in the rabbit. The new cyano compounds are also mescaline antagonists. The new compounds can therefore be used as anti-tussives or as analgesics. They may, however, also serve as intermediates for the manufacture of other useful substances, more especially of pharmacologically active compounds.

Particularly outstanding are the compounds of the formula

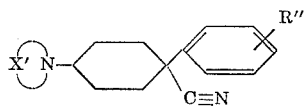

in which

represents a piperidino, pyrrolidino, hexamethyleneimino or morpholino radical and R" represents a hydrogen atom, a lower alkyl radical, a hydroxyl group, a lower alkoxy group, a halogen atom or a trifluoromethyl group, as well as the compounds of the formula

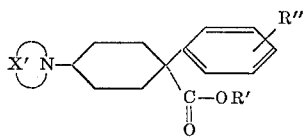

in which

and R" have the meanings given above, and R' represents a lower alkyl radical, for example the ethyl radical or primarily the methyl radical, and more especially the 1-phenyl-4-piperidino-cyclohexane carboxylic acid methyl ester which, for example in the form of its hydrochloride shows a pronounced anti-tussive effect in cats under Dial narcosis when administered intravenously in a dose of 3–10 mg./kg., and a distinct anti-morphine effect in rabbits under urethane narcosis when given intravenously in a dose of 1–3 mg./kg.

The new compounds are obtained by a method known per se.

Preferably, a cyclohexanone of the formula

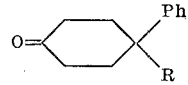

in which Ph and R have the meanings given above, is condensed with a compound of the formula

in which X has the meaning given above, and the resulting condensation product is reduced.

The condensation and the reduction are carried out in the customary manner. For example, the reduction may be performed with the aid of hydride ion transfer agents, for example with formic acid, or with catalytically activated hydrogen, such as hydrogen in the presence of a hydrogenation catalyst, such as platinum or palladium catalyst, for example platinum oxide or palladium black.

A further process for the manufacture of the new compounds consists in reacting a compound of the formula

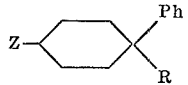

in which Ph and R have the meanings given above, and Z stands for a halogen atom or an arylsulfonyloxy group, with a compound of the formula

in which X has the meaning given above.

A halogen atom is, for example, a chlorine or bromine atom, and an arylsulphonyloxy group is above all a para-toluenesulphonyloxy group, para - bromobenzenesulphonyloxy group or benzenesulphonyloxy group.

The reaction takes place in the ordinary manner, advantageously in the presence of a basic agent.

In a resulting compound the substituents R may be converted into one another. For example, cyano groups may be converted into carbalkoxy groups, for example by alkanolysis, that is to say by reaction with an alkanol in the presence of sulphuric acid and in the presence of ammonium chloride.

Another possibility for the conversion of cyano groups into carbalkoxy groups consists, for example, in hydrolysing the cyano group to the carbamoyl group, for example in the presence of a strong base, such as an alkali metal hydroxide, for example sodium or potassium hydroxide, and hydrolysing the carbamoyl group to the carboxyl group. The hydrolysis of the carbamoyl group is preferably carried out in the presence of a strong acid, for example a mineral acid, such as hydrochloric acid and in the presence of nitrous acid. The free carboxyl group may then be converted, for example by reaction with a diazoalkane, into a carbalkoxy group.

Depending on the process conditions and starting materials used, the final products are obtained in the free form or in the form of their salts, which are also included in the invention. The salts of the final products may be converted in a manner known per se, for example with an alkali or an ion exchanger into the free bases. Salts may be obtained from the latter by reaction with an organic or inorganic acid, especially an acid which is suitable for the formation of therapeutically useful salts. Acids of this type are, for example: hydrohalic acids, sulphuric acids, phosphoric acids, nitric acid, perchloric acid, aliphatic, alicyclic, aromatic or heterocyclic carboxylic or sulphonic acids, such as formic, acetic, propionic, succinic, glycolic, lactic, malic, tartaric, citric, ascorbic, maleic, hydroxy-maleic or pyruvic acid; phenylacetic, benzoic, para-aminobenzoic, anthranilic, para-hydroxybenzoic, salicylic or para-aminosalicylic acid, embonic acid, methanesulphonic, ethanesulphonic, hydroxyethanesulphonic, ethylenesulphonic acid; halobenzenesulphonic, toluenesulphonic, napthalenesulphonic acid or sulphanilic acid; methionine or tryptophan.

These or other salts of the new compounds, for example the picrates, may also serve for the purification of the resulting free bases by converting the free bases into the salts, separating the latter and again liberating the bases from the salts. In view of the close relationship between the new compounds in the free form and in the form of their salts what has been said above and hereinafter with reference to the free compounds refers similarly also to the corresponding salts wherever this applies.

Depending on the starting materials and the methods used, the new compounds may be in the form of mixtures of their cis- and trans-forms or as pure cis- or pure trans-forms. Mixtures of the cis- and trans-forms may be separated in a manner known per se, for example by chromatography and/or fractional crystallization in to the pure cis- and trans-forms respectively by virtue of the physico-chemical differences of the constituents.

On condensation of the cyclohexanone and catalytic hydrogenation of the condensation product there are obtained, for example, practically only trans-compounds (cf. Examples 1–10), whilst on reducing with hydride ion transfer agents such as formic acid or sodium borohydride in the presence of acids a mixture of the two isomers is obtained. On reacting the trans-form of an arylsulfonyloxycyclohexane, such as a tosylated cyclohexanol, practically only the cis-compounds are formed (cf. Examples 11 to 13).

The invention also include those modifications of the process in which a compound obtainable as intermediate in the course of the process is used as starting material and the remaining process steps are carried out, or the process is discontinued at any stage, or in which the starting materials are formed in situ or in which the reaction components are used in the form of their salts.

Preferably such starting materials are used for the reactions of the invention as yield the above-mentioned preferred compounds.

The starting materials are known or may be obtained in a manner known per se.

The new compounds may be used, for example in the form of pharmaceutical preparations which contain them in the free form or in the form of their physiologically tolerable salts in admixture or conjunction with an organic or inorganic, solid or liquid carrier suitable for enteral, parenteral or topical application. For example substances may be used as carriers that do not react with the new compounds, e.g. water, gelatin, lactose, starches, stearyl alcohol, magnesium stearate, talc, vegetable oils, benzyl alcohols, gums, propyleneglycols, white petroleum jelly or any other known pharmaceutical carrier. The pharmaceutical preparations may be in the form, for example, of tablets, dragées, capsules, salves, creams or in liquid forms as solutions, suspensions or emulsions. They may be sterilized and/or contain auxiliary substances, such as preserving, stabilizing, wetting or emulsifying agents, solution promoters or salts for the modification of the osmotic pressure or buffers. They may also contain other therapeutically useful substances. The pharmaceutical preparations are obtained by the ordinary methods.

The new compounds may also be used in veterinary medicine, for example in the form of feedstuffs or as additives to feedstuffs, the usual fillers, diluents or feedstuffs being used.

The following examples illustrate the invention.

EXAMPLE 1

20.0 g. of 4-cyano-4-phenyl-cyclohexanone (0.1 mol) are dissolved in 600 ml. of absolute benzene and boiled under reflux with 18 ml. of piperidine (0.18 mol) and 0.2 g. of para-toluenesulphonic acid for 15 hours, the water forming in the course of the reaction being removed by means of a water-separator. The benzene is then evaporated, at first under normal pressure and then at a water-jet vacuum. The 1-piperidino-4-cyano - 4 - phenyl - cyclohexene remaining as an oil is distilled off in a high vacuum and passes over at 163–165° C. (0.05 mm. pressure of mercury). The free base so obtained is dissolved in 500 ml. of ethanol and after the addition of 1.0 g. of platinum oxide hydrogenated under normal pressure. It is filtered off from the catalyst and the filtrate evaporated. The residue is dissolved in a little toluene and chromatographed over 200 g. of alumina (activity II, neutral). The first fractions eluted with 3.0 liters of toluene yield 1-cyano-1-phenyl-4-piperidino-cyclohexane of the formula.

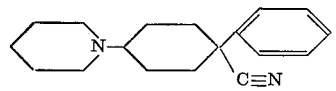

The free base is unitary in the thin-layer chromatogram (system: chloroform saturated with ammonia, carrier: silica gel, indicator: iodine).

A solution of 8 g. of the free base in 100 ml. of isopropanol is mixed with the calculated quantity of a solution of hydrochloric acid in isopropanol to yield 1-cyano-1-phenyl-4-piperidino-cyclohexane hydrochloride melting at 317–319° C.

EXAMPLE 2

18.0 g. of 1-phenyl-1-cyano-4 - piperidino - cyclohexane are dissolved in 27.6 g. of ethanol, treated with 18.0 g. of sulphuric acid of 96% strength, 0.48 ml. of water and 3.24 g. of ammonium chloride, and heated for 8 hours in an autoclave at 160° C. The reaction mixture is dissolved in 1.0 liter of water, the aqueous solution extracted with 200 ml. of toluene each time and adjusted at 0° C. to a pH value of 11 to 12 with saturated sodium carbonate solution and extracted three times with 500 ml. of chloroform each time. The organic phases are washed twice with 300 ml. of water each time, dried over sodium sulphate, filtered with suction and the filtrate evaporated. The residue is distilled in a high vacuum to yield 1-phenyl-4-piperidino-cyclohexane carboxylic acid ethyl ester of the formula

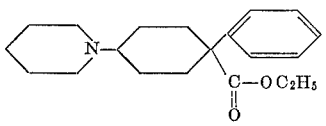

which passes over at 156–164° C. under 0.15 mm. pressure of mercury. The 1-phenyl-4-piperidino-cyclohexane carboxylic acid ethyl ester hydrochloride prepared in the ordinary manner is recrystallized from isopropanol and melts at 218–220° C.

The free base is unitary in the thin-layer chromatogram (system: chloroform saturated with ammonia+ toluene 1:3, carrier: silica gel, indicator: iodine).

EXAMPLE 3

24.2 g. of 1-phenyl-1-cyano-4-piperidino-cyclohexane are dissolved in 65 ml. of methanol and treated with 36.5 g. of sulphuric acid of 96% strength, 5.0 ml. of water and 5.5 g. of ammonium chloride, and heated for 8 hours at 150° C. The reaction mixture is diluted with 500 ml. of water and extracted with 2× 250 ml. of toluene. The aqueous solution is then adjusted to a pH value of 11 to 12 at 0° C. by the addition of saturated sodium carbonate solution and extracted with 3× 300 ml. of chloroform. The chloroform solution is washed with 2× 300 ml. of water, dried over sodium sulphate, filtered with suction and the filtrate evaporated under vacuum. The residue is dissolved in a little toluene and chromatographed over 160 g. of alumina (activity II, neutral). The first fractions eluted with 3.5 liters yield pure 1-phenyl-4-piperidino-cyclohexane carboxylic acid methyl ester which is dissolved in 100 ml. of ethyl acetate and treated with a solution of hydrochloric acid in ethyl acetate, to yield 1-phenyl-4-piperidino-cyclohexane carboxylic acid methyl ester hydrochloride of the formula

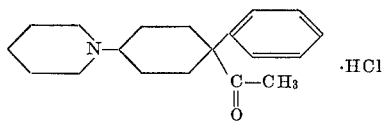

melting at 236–237° C. The compound is unitary in the thin-layer chromatogram (system: chloroform saturated with ammonia+toluene 1:1, carrier: silica gel, indicator: iodine).

EXAMPLE 4

10.0 g. of 4-cyano-4-(para-chlorophenyl)-cyclohexanone are dissolved in 300 ml. of absolute benzene, boiled under reflux with 8 ml. of piperidine and 0.2 g. of para-toluenesulphonic acid for 15 hours, the water formed in the course of the reaction being removed by means of a water-separator. The benzene is evaporated first under normal pressure and then at a water-jet vacuum. The 1-piperidino - 4 - cyana-4 - (para - chlorophenyl) - cyclohexene remaining as an oil is distilled in a high vacuum and passes over at 182–185° C. under 0.06 mm. pressure of mercury. The so-obtained free base is dissolved in 500 ml. of ethanol and, after the addition of 1.0 g. of platinum oxide, hydrogenated under normal pressure. The catalyst is filtered off and the filtrate evaporated. The residue is dissolved in a little toluene and chromatographed over 150 g. of alumina (activity II, neutral). The first fractions eluted with 3.0 liters of toluene yield 1-(para-chlorophenyl)-1-cyano-4-piperidino-cyclohexane of the formula

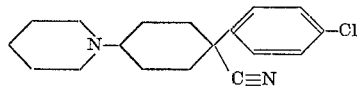

The free base is unitary in the thin-layer chromatogram (system: chloroform saturated with ammonia+toluene 1:2, carrier: silica gel, indicator: iodine).

By treating a solution of 7.8 g. of the free base in 90 ml. of ethyl acetate with the calculated quantity of a solution of hydrochloric acid in ethyl acetate, 1-(para-chlorophenyl)- 1-cyano-4-piperidino-cychlohexane hydrochloride melting at 322–325° C. is obtained.

EXAMPLE 5

12.0 g. of 1-(para-chlorophenyl)-1-cyano-4-piperidino-cyclohexane are dissolved in 20.8 ml. of ethanol and treated with 16.2 g. of sulphuric acid of 96% strength, 2.16 ml. of water and 2.118 g. of ammonium chloride, and the whole heated for 8 hours at 150° C. The oily reaction mixture is then dissolved in 400 ml. of water and the aqueous solution extracted with 2×150 ml. of toluene and adjusted to pH 11 to 12 at 0° C. with saturated sodium carbonate solution. The separated oil is extracted with 3× 300 ml. of chloroform, the organic extracts washed with 2× 200 ml. of water, dried over sodium sulphate, filtered with suction and evaporated. The residue is dissolved in 60 ml. of ethyl acetate, filtered and the clear filtrate treated with a solution of hydrochloric acid in ethyl acetate, to yield 1-(para-chlorophenyl)-4-piperidino-cyclohexanecarboxylic acid ethyl ester hydrochloride of the formula

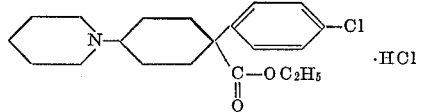

melting at 221–223° C. The compound is unitary in the thin-layer chromatogram (system: chloroform saturated with ammonia+toluene 1:3, carrier: silica gel, indicator: iodine).

EXAMPLE 6

20.0 g. of 1-(para-chlorophenyl)-1-cyano-4-piperidino-cyclohexane are dissolved in 45 ml. of methanol and treated with 27.1 g. of sulphuric acid of 96% strength, 3.6 ml. of water and 4.13 g. of ammonium chloride and heated for 8 hours at 150° C. The reaction mixture is dissolved in 1500 ml. of water, the aqueous solution extracted with 2×150 ml. of toluene and adjusted to a pH value of 11 to 12 at 0° C. by the addition of saturated sodium carbonate solution and extracted three times with 1 liter of chloroform each time. The organic phases are washed with 2× 800 ml. of sodium chloride solution of 17% strength, dried over sodium sulphate, filtered with suction and the filtrate evaporated. The residue is dissolved in 50 ml. of acetone, filtered, and the clear filtrate treated with a solution of hydrochloric acid in ethyl acetate, to yield 1-(para-chlorophenyl)-4-piperidino-cyclohexane carboxylic acid methyl ester hydrochloride of the formula

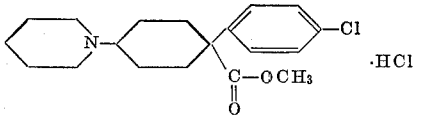

melting at 239–241° C.

The compound is unitary in the thin-layer chromatogram (system: chloroform saturated with ammonia+toluene 1:3, carrier: silica gel, indicator: iodine).

EXAMPLE 7

20.0 g. of 4-cyano-4-(meta-methoxyphenyl)-cyclohexanone are dissolved in 400 ml. of absolute benzene, boiled under reflux with 20 ml. of piperidine and 0.2 g. of paratoluenesulphonic acid for 15 hours, the water forming in the course of the reaction being removed by means of a water-separator. The benzene is evaporated first under normal pressure and then at a water-jet vacuum. The 1 - piperidino - 4 - cyano - 4 - (meta - methoxyphenyl)-cyclohexene remaining as an oil is distilled in a high vacuum and passes over at 184–187° C. under 0.04 mm. pressure of mercury. The so-obtained free base is dissolved in 500 ml. of absolute ethanol and, after the addition of 2.0 g. of platinum oxide, hydrogenated under normal pressure. The catalyst is filtered off and the filtrate evaporated. The 1-(meta-methoxyphenyl)-1-cyano-4-piperidino-cyclohexane of the formula

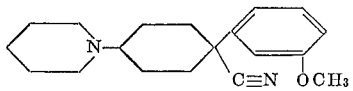

remaining as residue is unitary in the thin-layer chromatogram (system: chloroform saturated with ammonia+toluene 1:3, carrier: silica gel, indicator: iodine) and boils in a high vacuum at 176–177° C. under 0.045 mm. pressure of mercury.

The 1-(meta-methoxyphenyl)-1-cyano-4-piperidino-cyclohexane hydrochloride prepared in the ordinary manner melts after recrystallization from isopropanol at 270–274° C., or after recrystallization from ethyl acetate at 290–292° C.

EXAMPLE 8

13.4 g. of 1-(meta-methoxyphenyl)-1-cyano-4-piperidino-cyclohexane are treated with 30.7 g. of ethanol, 13.5 g. of sulphuric acid of 96% strength, 1.8 ml. of water and 2.4 g. of ammonium chloride and heated for 7 hours at 150° C. The reaction mixture is dissolved in 400 ml. of water, the aqueous solution extracted with 2× 200 ml. of toluene and the pH value adjusted to 11 to 12 at 0° C. by the addition of saturated sodium carbonate solution and extracted with 3× 300 ml. of chloroform. The organic phases are washed with 2× 300 ml. of water, dried over sodium sulphate, filtered with suction and evaporated. The residue is dissolved in a little solvent mixture, chloroform+toluene (1:4), and chromatographed over 120 g. of alumina (activity II, neutral). The first fractions eluted with 3 litres of chloroform+toluene (1:4) yield 1 - (meta - methoxy - phenyl )- 4 - piperidino - cyclohexane carboxylic acid ethyl ester of the formula

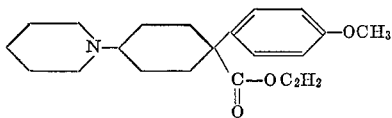

The 1 - (meta - methoxy - phenyl - 4 - piperidino - cyclohexanecarboxylic acid ethyl ester hydrochloride prepared in the ordinary manner is recrystallized from ethyl acetate and melts at 203–206° C. The compound is unitary in the thin-layer chromatogram (system: chloroform saturated with ammonia+toluene 1:3, carrier: silica gel, indicator: iodine).

EXAMPLE 9

10 g. of 1-cyano-1-phenyl-4-piperidino-cyclohexane and 10 g. of potassium hydroxide are boiled under reflux for 36 hours in a mixture of 120 ml. of methyl Cellosolve and 25 ml. of water. The solvent is then distilled off in vacuo, the evaporation residue is dissolved in 1 liter of water and the aqueous phase extracted with 3× 300 ml. of chloroform. The combined chloroform extracts are washed with 500 ml. of water, dried over sodium sulphate and evaporated, to yield crude 1-phenyl-4-piperidino-cyclohexane carboxylic acid amide in the form of pale yellow crystals which are processed directly without further purification.

The compound is unitary in the thin-layer chromatogram (system: chloroform saturated with ammonia, carrier: silica gel, indicator: iodine). The hydrochloride prepared in the ordinary manner melts at >300° C.

10 g. of 1-phenyl-4-piperidino-cyclohexane carboxylic acid amide are dissolved in 100 ml. of concentrated hydrochloric acid and reacted with a solution of 30 g. of sodium nitrite in 40 ml. of water. The sodium nitrite solution is added dropwise under the surface of the hydrochloric acid solution: dropping time: 60 minutes. The reaction is slightly exothermic and the internal temperature rises to 40° C. The mixture is then left to react for 1 hour at room temperature and for 3 hours at 100° C. The reaction mixture is then evaporated in vacuo, the residue again suspended twice in 100 ml. of ethanol each time and dried by azeotropic distillation in vacuo. The evaporation residue is boiled under reflux for ten minutes three times with 340 ml. of absolute ethanol each time, and the hot solution filtered with suction. The combined filtrates are evaporated in vacuo to yield crude 1-phenyl-4-piperidino-cyclohexane carboxylic acid hydrochloride.

15.0 g. of crude 1-phenyl-4-piperidino-cyclohexane-carboxylic acid hydrochloride are dissolved in 500 ml. of methanol under reflux, the hot, clear solution cooled to 20° C. and reacted with 100 ml. of an ethereal solution of diazomethane. The yellow solution is allowed to stand for 30 minutes at 0° C. and then for 30 minutes at 20° C. The solvent is then evaporated in vacuo at 50° C., the evaporation residue dissolved in 300 ml. of cold 2 N hydrochloric acid and the neutral portions extracted with 200 ml. of toluene; the hydrochloric acid solution is adjusted to a pH value of 11 to 12 with saturated sodium carbonte solution at 0° C. and extracted with 3× 300 ml. of chloroform. The combined chloroform solutions are washed with water, dried over sodium sulphate and evaporated. The residue is distilled in a high vacuum to yield pure 1-phenyl-4-piperidino-cyclohexane carboxylic acid methyl ester which passes over at 162–168° C. under 0.17 mm. pressure of mercury. The hydrochloride prepared in the customary manner melts at 236–237° C. and, according to its melting point, mixed melting point and thin-layer chromatogram (system: chloroform saturated with ammonia+toluene 1:1, carrier: silica gel, indicator: iodine), is identical with the compound described in Example 3.

EXAMPLE 10

20.0 g. of 4-cyano-4-phenyl-cyclohexanone (0.1 mol) are dissolved in 500 ml. of absolute benzene and boiled under reflux with 18 ml. of morpholine (0.2 mol) and 0.2 g. of paratoluenesulphonic acid for 15 hours, the water formed in the course of the reaction being removed by means of a water-separator. The benzene is evaporated first under normal pressure and then at a water-jet vacuum. The 1-morpholino-4-cyano-4-phenyl-cyclohexene remaining as an oil is distilled in a high vacuum and passes over at 175–181° C. under 0.07–0.1 mm. pressure of mercury. The so-obtained free base is dissolved in 500 ml. of ethanol and, after the addition of 1.0 g. of platinum oxide, is hydrogenated under normal pressure. The catalyst is filtered off and the filtrate evaporated. The residue is dissolved in a little toluene and chromatographed over 200 g. of alumina (activity II, neutral). The first fractions eluted with 3.0 liters of toluene yield, on evaporation of the solvent, 1-cyano-1-phenyl-4-morpholino-cyclohexane of the formula

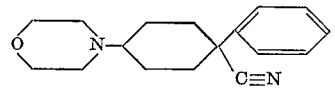

which is unitary in the thin-layer chromatogram (system: chloroform saturated with ammonia+toluene 1:1, carrier: silica gel, indicator: iodine).

By treating a solution of this compound in 400 ml. of ethyl acetate with a solution of hydrochloric acid in ethyl acetate 1-cyano-1-phenyl-4-morpholino-cyclohexane hydrochloride melting at 303–305° C. is obtained.

EXAMPLE 11

7.1 g. (0.02 mol) of 1-cyano-1-phenyl-4-(paratoluenesulphonyloxy)-cyclohexane are dissolved in 10 ml. of piperidine and the clear solution boiled under reflux for 4 hours. After cooling to 40° C., the solution is evaporated in vacuo at a bath temperature of 50° C. The resulting oil is dissolved in 250 ml. of toluene and extracted three times with 250 ml. of 2 N hydrochloric acid. The hydrochloric acid solutions are washed with 250 ml. of toluene, rendered strongly alkaline with 6 N sodium hydroxide solution and extracted three times with 500 ml. of chloroform. The combined chloroform solutions are washed with water, dried over sodium sulphate and evaporated. The residue is distilled in a high vacuum to yield 1-phenyl-1-cyano-4-piperidino-cyclohexane of the formula

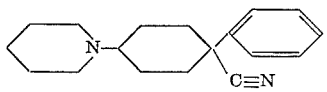

The 1-phenyl-1-cyano-4-piperidino-cyclohexane hydrochloride prepared in the customary manner is recrystallized from acetone and melts at 216–218° C. According to the thin-layer chromatogram and infrared spectrum it is not identical with the product described in Example 1.

The 1-cyano-1-phenyl-4-(para-toluene-sulphonyloxy)-cyclohexane used as starting material may be prepared as follows:

9.99 g. (0.05 mol) of 4-cyano-4-phenyl-cyclohexanone are dissolved in 100 ml. of ethyl acetate and, after the addition of 0.5 g. of platinum oxide, hydrogenated under normal pressure. The catalyst is filtered off and the filtrate evaporated. The 4-cyano-4-phenyl-cyclohexanol remaining behind as oil is distilled in a high vacuum and passes over at 132–136° C. under 0.07 mm. pressure of mercury. The distillate is recrystallized from ether and yields 4-cyano-4-phenyl-cyclohexanol in the form of crystals melting at 112–114° C.

5.0 g. (0.025 mol) of 4-cyano-4-phenyl-cyclohexanol are dissolved in 30 ml. of absolute pyridine and the pale yellow solution cooled to 0° C. 7.2 g. of finely ground paratoluenesulphonic acid chloride are then added in portions and the solution allowed to stand for 20 hours at room temperature. For the purpose of working up, the pyridine solution is poured onto 500 g. of ice and the precipitate crystals extracted twice with 400 ml. of ethyl acetate. The organic phases are washed three times with 400 ml. of N hydrochloric acid and three times with 400 ml. of water. The combined ethyl acetate solutions are dried over sodium sulphate and evaporated at a maximum bath temperature of 40° C. The residue is recrystallized from ether to yield 1-cyano-1-phenyl-4-(para-toluenesulfonyloxy)-cyclohexane melting at 115–117° C.

EXAMPLE 12

In an analogous manner to that described in Example 11 there is obtained from 1-cyano-1-phenyl-4-(paratoluenesulphonyloxy)-cyclohexane, prepared as described below, and piperidine, 1-cyano-1-phenyl-4-piperidinocyclohexane hydrochloride which is identical with the compound described in Example 11.

The 1-cyano-1-phenyl-4 - (para-toluenesulphonyloxy)-cyclohexane used as starting material is prepared as follows:

10 g. (0.05 mol) of 4-cyano-4-phenyl-cyclohexanone are dissolved in 100 ml. of dioxane and 5 g. of sodium boron hydride are added in portions to the clear solution. The whole is then boiled under reflux for 1 hour. For the purpose of working up, the reaction mixture is cooled to 20° C., poured on to 100 ml. of ice and the dioxan removed in vacuo. The oily residue is dissolved in 250 ml. of chloroform and the organic phase is washed in turn with 250 ml. of water, 250 ml. of 2 N hydrochloric acid, 250 ml. of water, 250 ml. of saturated sodium carbonate solution and twice more with 250 ml. of water. The aqueous solutions are extracted with 250 ml. of chloroform, the organic phases combined, dried over sodium sulphate and evaporated. For further purification the oily residue is dissolved in 100 ml. of ethyl acetate and chromatographed over 100 g. of alumina (activity II, neutral). The first fractions eluted with 1.0 liter of ethyl acetate yield a mixture of the cis- and trans-isomers of 4-cyano-4-phenyl-cyclohexanol in the form of a non-crystallizing oil.

10 g. of this mixture are dissolved in 50 ml. of absolute pyridine, the solution cooled to 0° C., 15.0 g. of finely ground para-toluene-sulphonic acid chloride are added in portions and the solution allowed to stand for 20 hours at room temperature. The pyridine solution is then poured on to 500 g. of ice and the precipitated crystals extracted twice with 600 ml. of ethyl acetate. The organic phases are washed three times with 500 ml. of N hydrochloric acid and three times with 500 ml. of water. The combined ethyl acetate solutions are dried over sodium sulphate and evaporated in vacuo at a bath temperature not higher than 40° C. An oily residue is obtained which, when crystallized from ether, yields crystals melting at 114–116° C. and shows no depression with the tosylate described in Example 11. Both compounds show identical infrared spectra (3% solution in methylene chloride) and are identical in the thin-layer chromatogram (system chloroform and toluene 1:1, carrier silica gel, indicator: iodine).

When the para-toluenesulphonate present in the mother liquor is reacted with piperidine, there is obtained 1-cyano-1-phenyl-4-piperidino - cyclohexane hydrochloride which is not identical with the above described compound but with that described in Example 1.

EXAMPLE 13

12.3 g. of 1-cyano-1-phenyl-4-piperidino-cyclohexane (prepared as described in Example 11) are dissolved in 21.2 g. of ethanol, treated with 13.8 g. of sulphuric acid of 96% strength and 2.8 g. of ammonium chloride, and the batch is heated for 7 hours in an autoclave at 160° C. The reaction mixture is poured into 200 g. of ice and 200 ml. of water and adjusted to a pH of about 11–12 with concentrated sodium hydroxide solution at 0° C. The reaction mixture is then extracted immediately three times with 500 ml. of chloroform each time. The organic phases are washed with 2× 300 ml. of water, dried over sodium sulphate, filtered with suction and evaporated. The 1-phenyl-4-piperidinocyclohexane-carboxylic acid ethyl ester of the formula

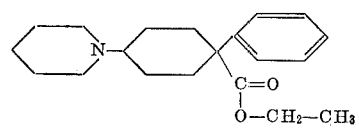

remaining as an oil is unitary in the thin-layer chromatogram (system: chloroform saturated with ammonia + toluene 1:3, carrier: silica gel, indicator: iodine).

The 1 - phenyl - 4 - piperidino - cyclohexanecarboxylic acid ethyl ester hydrochloride, prepared in the customary manner, is recrystallized from acetone and melts at 204–206° C.

A mixture of this compound and its isomer (cf. Example 2) melts at 190–193° C.

EXAMPLE 14

Tablets containing 25 mg. of 1 - phenyl - 4 - piperidino-cyclohexane carboxylic acid methyl ester hydrochloride may be prepared, for example with the following ingredients:

| | Mg. |
|---|---|
| 1 - phenyl - 4 - piperidino - cyclohexane - carboxylic acid methyl ester hydrochloride | 25.0 |
| Wheat starch | 40.0 |
| Lactose | 45.0 |
| Colloidal silicic acid | 5.0 |
| Arrowroot | 15.0 |
| Talc | 9.0 |
| Magnesium stearate | 1.0 |
| | 140.0 |

Method

The 1 - phenyl - 4 - piperidino - cyclohexane carboxylic acid methyl ester hydrochloride is mixed with one part of the wheat starch, with lactose and colloidal silicic acid, and the mixture passed through a sieve. The remaining wheat starch is pasted with 5 times the quantity of water on a water-bath and the powdery mixture kneaded with this paste until a slightly plastic mass is formed. The plastic mass is passed through a sieve having a mesh of about 3 mm., dried, and the dry granulate passed through a sieve again. Arrowroot, talc and magnesium stearate are then mixed in and the resulting mixture compressed to tablets weighing 140 mg.

What is claimed is:

1. A member selected from the group consisting of compounds of the formula

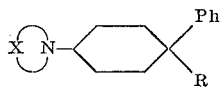

in which Ph stands for a member selected from the group consisting of phenyl and phenyl substituted by at least one member selected from the group consisting of lower alkyl, lower alkoxy, fluorine, chlorine, bromine and trifluoromethyl, R stands for a member selected from the group consisting of cyano and carbo-lower alkoxy and X for a member selected from the group consisting of lower alkylene forming with the nitrogen atom a ring having 4 to 8 ring members and mono-oxa-lower alkylene forming with the nitrogen atom a ring having 6 to 7 ring members and in which the oxygen atom is separated from the nitrogne atom by at least two carbon atoms and their acid addition salts.

2. A product as claimed in claim 1, in which Ph represents a member selected from the group consisting of phenyl, lower alkyl-phenyl, lower alkoxy-phenyl, fluoro-phenyl, chloro-phenyl, bromo-phenyl and trifluoromethyl-phenyl,

stands for a member selected from the group consisting of piperidino, pyrrolidino, hexamethyleneimino and morpholino and R for cyano.

3. A product as claimed in claim 1, in which Ph represents a member selected from the group consisting of phenyl, lower alkyl-phenyl, lower alkoxy-phenyl, fluoro-phenyl, chloro-phenyl, bromo-phenyl and trifluoromethyl-phenyl,

stands for a member selected from the group consisting of piperidino, pyrrolidino, hexamethyleneimino and morpholino and R for carbo-lower alkoxy.

4. A product as claimed in claim 1, which compound is the 1 - phenyl - 4 - piperidino - cyclohexane carboxylic acid methyl ester or an acid addition salt thereof.

5. A product as claimed in claim 1, which compound is the 1 - phenyl - 1 - cyano - 4 - piperidinocyclohexane or an acid addition salt thereof.

6. A product as claimed in claim 1, which compound is the 1 - (para - chlorophenyl) - 1 - cyano - 4 - piperidino-cyclohexane or an acid addition salt thereof.

7. A product as claimed in claim 1, which compound is the 1 - (meta - methoxyphenyl) - 1 - cyano - 4 - piperidino-cyclohexane or an acid addition salt thereof.

8. A product as claimed in claim 1, which compound is the 1 - phenyl - 4 - piperidino - cyclohexane - carboxylic acid ethyl ester or an acid addition salt thereof.

9. A product as claimed in claim 1, which compound is the 1 - (para - chlorophenyl) - 4 - piperidino - cyclohexane carboxylic acid ethyl ester or an acid addition salt thereof.

10. A product as claimed in claim 1, which compound is the 1 - (para - chlorophenyl) - 4 - piperidino - cyclohexane-carboxylic acid methyl ester or an acid addition salt thereof.

11. A product as claimed in claim 1, which compound is the 1 - (meta - methoxyphenyl) - 4 - piperidino - cyclohexane-carboxylic acid ethyl ester or an acid addition salt thereof.

12. A product as claimed in claim 1, which compound is the 1 - phenyl - 1 - cyano - 4 - morpholino - cyclohexane or an acid addition salt thereof.

13. A product claimed in claim 1 in its cis-form.
14. A product claimed in claim 1 in its trans-form.
15. A product claimed in claim 3 in its trans-form.
16. A product claimed in claim 3 in its cis-form.
17. A product as claimed in claim 4 in its trans-form.

References Cited

UNITED STATES PATENTS 2,858,316  10/1958  Morrer _____ 260—294.3

HENRY R. JILES, Primary Examiner

G. THOMAS TODD, Assistant Examiner

U.S. Cl. X.R.

260—239, 247.1, 247.2, 247.7, 293, 293.4, 294, 294.3, 294.7, 326.3, 326.5, 326.82, 326.87, 465, 469, 470, 473; 424—167, 248, 274